(12) United States Patent
Dowd

(10) Patent No.: US 9,143,595 B1
(45) Date of Patent: Sep. 22, 2015

(54) MULTI-LISTENER HEADPHONE SYSTEM WITH LUMINESCENT LIGHT EMISSIONS DEPENDENT UPON SELECTED CHANNELS

(76) Inventor: Ryan Michael Dowd, Memphis, TN (US)

(*) Notice: Subject to any disclaimer, the term of this patent is extended or adjusted under 35 U.S.C. 154(b) by 0 days.

(21) Appl. No.: 13/306,618

(22) Filed: Nov. 29, 2011

(51) Int. Cl.
| | |
|---|---|
| H04R 1/10 | (2006.01) |
| H04M 1/60 | (2006.01) |
| H04R 5/033 | (2006.01) |
| H04R 27/00 | (2006.01) |

(52) U.S. Cl.
CPC ............ H04M 1/6091 (2013.01); H04R 5/033 (2013.01); H04R 27/00 (2013.01)

(58) Field of Classification Search
USPC ................ 381/77, 74, 370, 384; 700/94; 455/575.2, 41.2, 41.3, 90.2, 518; 84/611, 612, 464 R
See application file for complete search history.

(56) References Cited

U.S. PATENT DOCUMENTS

| | | | |
|---|---|---|---|
| 7,228,190 | B2* | 6/2007 | Dowling et al. ............... 700/94 |
| 7,319,762 | B2 | 1/2008 | Andrea et al. |
| 7,917,082 | B2 | 3/2011 | Goldberg et al. |
| 2005/0160270 | A1* | 7/2005 | Goldberg et al. ............. 713/176 |
| 2005/0201569 | A1* | 9/2005 | Kuraoka et al. ................ 381/74 |
| 2006/0083393 | A1* | 4/2006 | Richenstein et al. ......... 381/302 |
| 2006/0095516 | A1* | 5/2006 | Wijeratne ..................... 709/205 |
| 2006/0287745 | A1* | 12/2006 | Richenstein et al. ........... 700/94 |
| 2007/0047740 | A1* | 3/2007 | Andrea ........................... 381/74 |
| 2007/0184881 | A1* | 8/2007 | Wahl et al. ................. 455/575.2 |
| 2008/0077261 | A1* | 3/2008 | Baudino et al. ................ 700/94 |
| 2008/0175403 | A1* | 7/2008 | Tan et al. ........................ 381/77 |
| 2010/0048134 | A1* | 2/2010 | McCarthy et al. ........... 455/41.3 |
| 2010/0061567 | A1* | 3/2010 | White ............................. 381/77 |
| 2011/0103607 | A1 | 5/2011 | Bychkov et al. |
| 2011/0245944 | A1* | 10/2011 | Louboutin ...................... 700/94 |
| 2012/0128172 | A1* | 5/2012 | Alden ............................ 381/77 |
| 2013/0003984 | A1* | 1/2013 | Belafonte et al. .............. 381/74 |

* cited by examiner

*Primary Examiner* — Vivian Chin
*Assistant Examiner* — Friedrich W Fahnert
(74) *Attorney, Agent, or Firm* — Hulsey, Hunt & Parks, P.C.; William S. Parks

(57) ABSTRACT

An overall wireless broadcast system utilizing headphones that react in terms of light colors and light impulses when attuned to specific broadcast channels is provided. Such a system provides a unique performance capability in relation to the whims and selections of headphone wearers and listeners at an event with multiple attendees, ostensibly creating a spontaneous, continually changing visual result for spectators and participants alike. The headphones utilized for such a purpose are particularly adapted to allow for channel selections based upon different broadcast music possibilities (such as from a DJ or music device located in sufficiently close proximity for a headphone wearer to receive the broadcast signal to the degree that the broadcast music can be properly heard within the headphones themselves) such that the headphones themselves become modified in their own presentation based upon such a channel selection. The headphone modifications at a minimum require outward displays of luminescent color of at least the ear pieces (and may include the headband portion as well) thereof, as well as impulses of such color attenuated to reflect the rhythm of the selected broadcast music received by the headphones themselves. In essence, a wearer (listener) has the ability to select different broadcast music not only to allow for their own listening pleasure, but the outward appearance of the headphones in relation to such a selection provides a unique visual view to other listeners and/or spectators, as well. The entire multi-listener system utilizing such multi-channel and multi-color headphones is encompassed within this invention as well.

12 Claims, 2 Drawing Sheets

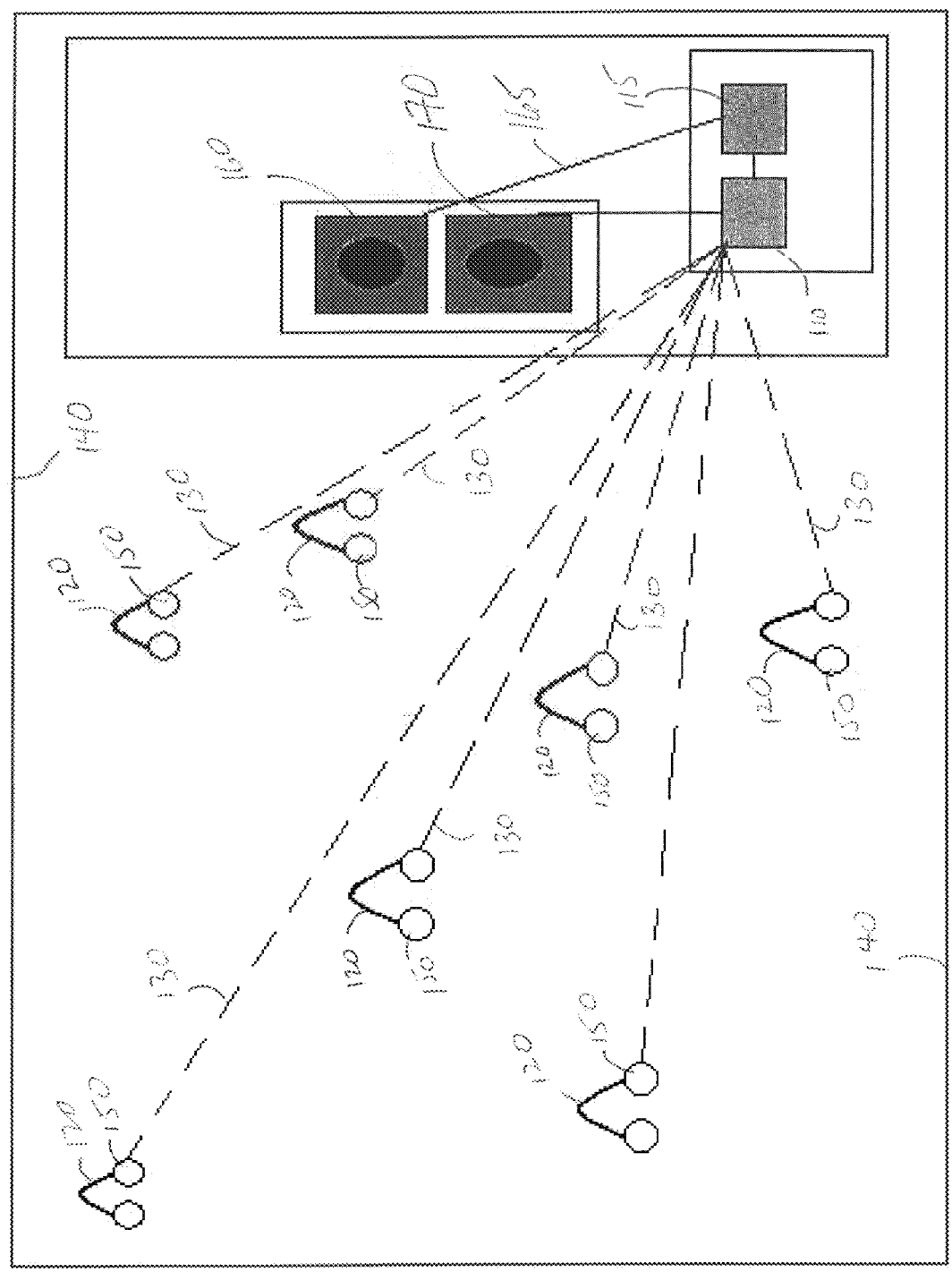

MULTI-LISTENER HEADPHONE SYSTEM WITH LUMINESCENT LIGHT EMISSIONS DEPENDENT UPON SELECTED CHANNELS

FIELD OF THE INVENTION

The present invention pertains to an overall wireless broadcast system utilizing headphones that react in terms of light colors and light impulses when attuned to specific broadcast channels. Such a system provides a unique performance capability in relation to the whims and selections of headphone wearers and listeners at an event with multiple attendees, ostensibly creating a spontaneous, continually changing visual result for spectators and participants alike. The headphones utilized for such a purpose are particularly adapted to allow for channel selections based upon different broadcast music possibilities (such as from a DJ or music device located in sufficiently close proximity for a headphone wearer to receive the broadcast signal to the degree that the broadcast music can be properly heard within the headphones themselves) such that the headphones themselves become modified in their own presentation based upon such a channel selection. The headphone modifications at a minimum require outward displays of luminescent color of at least the ear pieces (and may include the headband portion as well) thereof, as well as impulses of such color attenuated to reflect the rhythm of the selected broadcast music received by the headphones themselves. In essence, a wearer (listener) has the ability to select different broadcast music not only to allow for their own listening pleasure, but the outward appearance of the headphones in relation to such a selection provides a unique visual view to other listeners and/or spectators, as well. The entire multi-listener system utilizing such multi-channel and multi-color headphones is encompassed within this invention as well.

BACKGROUND OF THE INVENTION

A recent movement has taken hold throughout Europe, Australia, and the United States, at least, wherein a group of individuals don headphones to which is broadcast music from a proximally located music source, allowing for such a group to enjoy a common musical presentation, but with little to no invasion of undesirable loud noise to other locations nearby. Basically, this development has reduced the typical dance party, rave, disco, whatever wants to call it, from a loud, complicated cacophony of invasive sound to a shared experience through intimately provided music that all (at least some) participants enjoy together without encroaching on the listening pleasure of others. Likewise, such a possible arrangement permits individuals to actually speak to one another on the dance floor without having to shout above the typical din and difficulty loudspeakers and amplifiers can create simply by removing the personal headphones (or possibly just turning them off). Such a revolutionary way of providing group enjoyment without the potential for crowd-deafening shared noise has been making headway throughout the world, growing every year as many planners realize the benefits of permitting full group enjoyment of musical presentations (and still allow for self-expression in terms of dancing, at least, in such an environment) and at locations that in the past were not conducive to such happenings, particularly in late-night and/or urban settings.

The spectator without any headphone in such a setting is provided a unique visual experience to watch groups of people enjoy themselves and undertake dance moves without any clearly distinguished musical source for the spectator to understand such motivations. As such, these headphone-enabled dances, discos, raves, etc., provide more than just an audio means of enjoyment for listeners, but also visual montages of individuals expressing themselves in ways and manners that had not been experienced in the past.

Even more interestingly, such situations have actually led to the utilization of more than one musical source (such as two competing disc jockeys, for instance), further improving on the overall experience for participants and spectators by permitting more than one choice of music at one time. In those situations, multiple channels provide access to either broadcast music source (as, again, these are all wireless devices; it should be well understood that requiring any deliberate and dedicated connections between such headphones and the broadcast music sources would be rather cumbersome, if not impossible, to permit full enjoyment and freedom of the overall experience), thus leading one population of the event area to enjoy one source and the other to enjoy another at the same time. The resultant experience is thus unique for the listeners as one group would move and dance to one song while another group would enjoy a totally different tune; the spectators would also enjoy seeing the resultant chaotic movements (and possibly accompanying singing) of the overall dance floor in relation to such potentially disparate music sources. As such, the overall effect could lead to any number of unique outcomes, with disc jockeys competing for listeners due to their specific broadcast music selections (as one example), to specific groups of listeners providing dance steps in unison for one song with any number of responses in like manner from the other (or, if more than two music sources are present, even more chaos could ensue in such an instance). In other words, the overall experience is heightened for listeners and spectators alike when these headphone-enabled events are provided with multiple broadcast music sources.

The provision of such a multi-listener multiple headphone event has not been a simple endeavor in the past. The proper development of multiple headphones in a single setting that provide simultaneous access to even a single broadcast channel is the first obstacle. As well, such headphones must exhibit sufficient resiliency to undertake repeated use, not to mention continuous and, at times, rather violent movement, a suitable electrical source to ensure sufficient power exists to receive a signal from at least one music source as well as permit a dialed-in volume by the listener (and one that will not easily be disturbed during erratic movements, as alluded to above), as well as the capability to potentially change from one channel to another on demand by the listener. Beyond that, such headphones must also be of suitable comfort for a listener to keep such a device in place potentially for hours during such an event (not to mention, with a suitable dampening mechanism to best prevent extraneous sound from emanating external from the headphone earpieces; with multiple listeners potentially utilizing such headphones, if the bleed of sound from one is of a significant level, then combining the same result with one hundred (or even more) could lead to undesirable levels of noise generation that such a system was intended to prevent. In other words, the basic headphone designs that work to this end are rather difficult to accomplish themselves. Nothing has been proposed to date to move past these initial designs, however, to provide any further beneficial functions.

As such, it is important to realize that the overall effects, as discussed above, associated with these headphone-enabled events are just the start of the potential enjoyment levels participants and spectators alike might have. Raves are (in)famous for involving multi-colored lighting effects, both within the actual arena of enjoyment (through, for instance, synchronized light generation on a stage or overhead), coupled with brightly colored attire, iridescent light sticks, etc., that are worn or held by attendees. The overall effect is, in that situation, more than just a musical show, but an all-encompassing performance involving all participants with sound, light, color, etc., in concert. Although headphone-enabled concerts, discos, etc., provide a certain level of quietude (for spectators and external locations), the capability of incorporating further enhancements to the overall headphone-enabled experience has been limited to these rave-like features (i.e., supplied lighting, contributed clothing, hand-held implements, as examples), rather than involving the music source itself via the actual headphones. The potential to enliven the specific location and enhance the overall enjoyment level through any further effect provided by the multiple headphones in use has not been considered. Although individual headphones have been developed that provide certain visual effects, including lighting, flowing designs, and the like, these issues have not taken into consideration the potential for multi-listener events at all. As well, the designs and circuitry to accord the necessary overall effect to not just a single headphone device, but multiple types on a simultaneous basis, and pegged to either a channel selection or even a received signal to that end, has certainly not been of interest. Furthermore, the ability to provide any headphone device system in a multi-listener format, particularly wherein all such devices are wireless in nature and retain the needed levels of comfort, electronic performance, and music performance, let alone retain a resiliency to survive chaotic movements and other effects on a daily (or nightly or both) basis, and, even more so, allow for cleaning in such a timeframe without any deleterious effects from such a procedure, is not a simple, nor foreseeable end result within this industry. It should not be a surprise, then, that such a wireless headphone device, let alone on overall headphone-enabled multi-listener system, have yet to be provided this unique and growing entertainment area.

ADVANTAGES AND SUMMARY OF THE INVENTION

An advantage of the inventive system is the capability of multiple participants and listeners to select different color and light schemes for their own headphones based upon the specific broadcast channel to which they are currently listening. Another advantage is the possibility to change such color and light schemes through changing from one broadcast channel to another. Yet another advantage is the capability of the color and light schemes of the target headphones to react in relation to the rhythm of the specific music broadcast on the listener's selected channel. And yet another advantage of this inventive system is the effect of permitting multiple listeners the choice of different color and light schemes from their own personal headphones in relation to selected broadcast channels, thereby creating an overall tapestry of constantly moving and changing views of an entire listening audience with differing color and light schemes and potentially also rhythmically pulsating lights as well. Still another advantage of this inventive headphone-enabled multi-listener system is the provision of every aspect of such a performance on the personal whims and choices of the participating listeners, as well as providing non-listening spectators a unique performance to view for themselves. Additionally, such a system provides the advantage of all of these aspects with little to no extraneous noise emanating from the multiple headphones in use, thus allowing for a non-intrusive event in terms of sound.

Accordingly, this invention encompasses a headphone-enabled multi-listener music-based system, wherein said system includes at least one transmitter source to broadcast a signal to multiple headphones that include at least one ear piece that provides total coverage of a user's ear upon proper placement thereover as well as a headband component that provides stability to the headphones over a user's head, wherein said headphones are wirelessly configured to receive such a signal within a certain proximate range of said transmitter, wherein at least a plurality of said multiple headphones utilized within such system include embedded or surface-located light-generating components that provide different colors as a result of a user's selection of a specific broadcast channel provided by said at least transmitter source, and wherein said light-generating components are present within both said at least one ear piece and within said headband component. Also encompassed within this invention is the same system wherein at least two different broadcast channels are utilized from said transmitter source and wherein said plurality of said multiple headphones included embedded or surface-located light-generating components change colors in relation to the selected broadcast channel such that no two broadcast channels will provide the same colors within such headphones. Further encompassed within this invention is a headphone device including two ear pieces and a headband and including a receiver therein that wirelessly receives signals from a closely located transmitter, wherein said headphone includes ear pieces of sufficient size to cover a user's ears when placed thereover, and wherein said headphones includes embedded and/or surface-located light-generating components within both of said ear pieces as well as at least a portion of said headband such that receipt of a signal from a closely located transmitter would allow for a specific color generated by said light-generating components. As well, both the system and headphones indicated above including audio sensitive light-generating components that react to the rhythmic impulses of music received by said headphones from such a transmitter are also encompassed within this invention.

To that end, it is important to realize that wireless headphones exist in the industry, and, particularly for multi-listener events. To date, however, none have been provided that include light-generating components of any type that are pegged to transmitted signals received by such headphone devices. At best, the indicator light on a headphone as to electrical presence (i.e., an on/off indicator) or, with multiple channels, a single light that changes color in relation to channel selection (generally present on the ear pieces, again, as a small indicator light) have been utilized in terms of light concerns with such devices. Nothing has been taught nor fairly suggested as to utilizing a wireless multi-listener system with multiple headphones as those noted above.

Such unique headphones thus require a proper level of light-generating potential for a spectator, at least, to be able to comprehend the color provided by a user's specific broadcast channel selection. The small indicator lights noted above might provide a close-up view of such a selection result, but the headphones disclosed within this invention are of the type that the outward appearance generated by such an action would clearly evince a specific channel has been selected from a distance. Thus, the measured candlepower (intensity from the source) from such light-generating components should be at least a magnitude higher than that exhibited by such prior indicator lights (as measured in total of the number of light-generating components present within both the prior devices and the new, inventive headphones). Thus, if the candlepower measured by such prior devices is 1, than the inventive device will exhibit at least 10. Additionally, the light source available for such widespread headphone coverage should be one that does not generate any appreciable temperature that could potentially harm the headphone wearer (i.e., listener). Standard incandescent bulbs would not be useful for such a situation, for obvious reasons, let alone the difficulty in providing color changes for an overall effect with such types. Thus, light emitting diodes (LEDs) and like light-generating components are preferred for such a novel device, particularly since color change schemes are facilitated in this manner (through a rotating die, for example, emitting different wavelengths upon application of electricity thereto, coupled to the channel switch thus changing emanating color in response to channel selection). Such low-temperature light-generating sources also exhibit relatively low power requirements for proper functioning. As the wireless headphones of this invention are battery-powered, the ability to provide such results with low power consumption levels aids immeasurably as well. Of particular importance in that regard is the fact that such headphone-enabled events are generally provided by outfits that move from one location to another regularly and thus must have sufficient numbers of properly powered headphone devices at the ready for lengthy events as they occur. Furthermore, such light-generating components may be selected in relation to audio sensitivity, if desired, in order to allow for light impulses created in concert with the rhythm of the music received by the inventive headphones during utilization.

Thus, in addition to the necessity of providing headphones that are comfortable to users, do not easily break, are easy to turn on and off and change channels on demand, and perform as flawlessly as possible over a long period of time on a continuous basis (not to mention can be easily cleaned and/or disinfected without any chemical degradation of the parts requiring such treatments), the capability of such a device to retain as much power for effective performance as a receiver of a signal transmission as well as a portion of the overall performance itself (via the color schemes and/or light impulses) is not a simple task, particularly as such devices are provided within a wireless broadcast context.

The materials for such headphones are preferably of sufficiently rigid and resilient polymer for the casing of the ear pieces (thus housing the receiver, power and broadcast channel selection switches, transducers, and other light-generating controls, if needed), such as polyacrylate, high density polyethylene, polyaramid, polymide, polyetherimide, cyclic olefin copolymer, polyvinyl chloride, basically any thermoplastic material (or combination of such materials) that accords a proper resiliency to retain and protect the internally stored electronic components therein, as well as the light-emitting parts. Additionally, such a material would preferably, though not necessarily, exhibit the proper dielectric properties so as to permit complete transmission of electrical and/or wireless signals therethrough during utilization. As such, any of the polymers listed above (as well as many others) would function properly for such a purpose. Preferably, such a material would be selected from high density polyethylene and polyacrylate, although, again, any such low dielectric constant/resilient thermoplastic may work in that respect. As well, certain thermoset formulations may also be employed for such a purpose.

The headband portion is make of likewise durable materials, at least externally speaking; a flexible metal component may be housed therein to provide the desired degree of manipulation to permit a user the ability to fit the headphones properly over a person's head and thereafter retain such in the set position without manually applying force thereto. Preferably, though not required, the ear pieces and headband portion are made from transparent or translucent materials that can either permit proper housing and/or embedding of the light-generating components noted above. In this manner, the overall light-generating effect may be increased through the qualities of the polymer material in terms of light transmission and different colors or hues provided as a result (i.e., with a transparent black polymer material, the colors generated by the LED (or other like light sources) may be tempered to a certain effect as a result. Likewise, a lighter color (such as pink, blue, green, and the like) may create differing results as well. There is basically no limit as to the selected colors and types of polymer materials of these component parts of the inventive headphones. If the light-generating components are placed on the surface of such materials, however, in order to reduce costs, as alluded to above, the manufacturer may decide to utilize a completely opaque polymer material as the effects of transparent and/or translucent types may not provide any benefit otherwise.

The headband portion would also include, generally, means to allow for proper size selection for different users. This is typically accorded through a properly nested armature in male/female configuration that provides effective temporary repositioning to different heights (and thus allows for housing of the flexible headband component, such as a flexible, curved metal material, as noted above). Such an armature may include wires therein to allow for proper connection of the light-generating components around the periphery of the headband portion (if desired) as well as to permit complete connection of the electrical components from the power source (i.e., battery) located within one ear piece that needs to supply charge to the other (through the headband portion). Additionally, then, the headband portion itself would provide such an enclosure for such wiring to that effect.

The ear pieces thus include necessary transducer elements to permit proper sound generation from a wireless broadcast signal. Any type of transducer (electret, rolling coil, electrostatic, plasma-based, etc.) may be utilized for this purpose, as long as such a transducer is conducive to a wireless environment and can easily be utilized within such a headphone device and withstand repeated use in a dance, disco, rave, etc., setting. In order to provide the necessary comfort level, the ear pieces should also include a proper padded covering that allows for the user's ears to be well covered/surrounded during use. Such a padded covering may be removable for cleaning (if desired), or it may be permanently retained on such a device. If so, the padded materials should withstand spraying, wiping, etc., with disinfectant or cleaner without any appreciable degradation in response thereto.

For efficiency sake, such wireless headphones should include, as alluded to above, the power source, channel selection switch, signal receiver, and light-generator controls (at least) within one ear piece. If the headphone device includes only a single ear piece, such components would be located specifically within that component, for obvious reasons. Such a single ear piece headphone device would not be the standard type for such a headphone-enabled system or event as described in this invention, however, there may be situations where such a single ear piece device is desired in relation to light-generation capabilities as provided for herein. Such ear piece configurations are typical, except for the provision of proper controls for embedded, etc., light-generating components within, on, etc., the components of such a headphone device. However, such further controls are easily housed within the control ear piece component and would not hinder any operations thereof.

All in all, such an inventive system is thus facilitated through the utilization of multiple inventive headphone devices as described herein and in greater detail below.

There is thus provided in accordance with an embodiment of the present invention audio apparatus, including an audio player, housed within a casing, for producing audio output, a port on a surface of the casing for inserting a headphone connector therein, a light emitting source, a power source, housed within the casing, for supplying power to the audio player and to the light emitting source, and a headphone for listening to audio output produced by the audio player, including a connector for insertion into the port, and a light pipe for transmitting light generated by the light emitting source.

BRIEF DESCRIPTION OF THE DRAWINGS

The present invention will be more fully understood and appreciated from the following detailed description, taken in conjunction with the drawings in which:

FIG. 3 is a simplified block diagram of the overall multi-listener system encompassed by the invention utilizing the headphone embodiment of FIGS. 1 and 2.

DETAILED DESCRIPTION OF THE DRAWINGS AND THE PREFERRED EMBODIMENTS

Figures 1, 2:
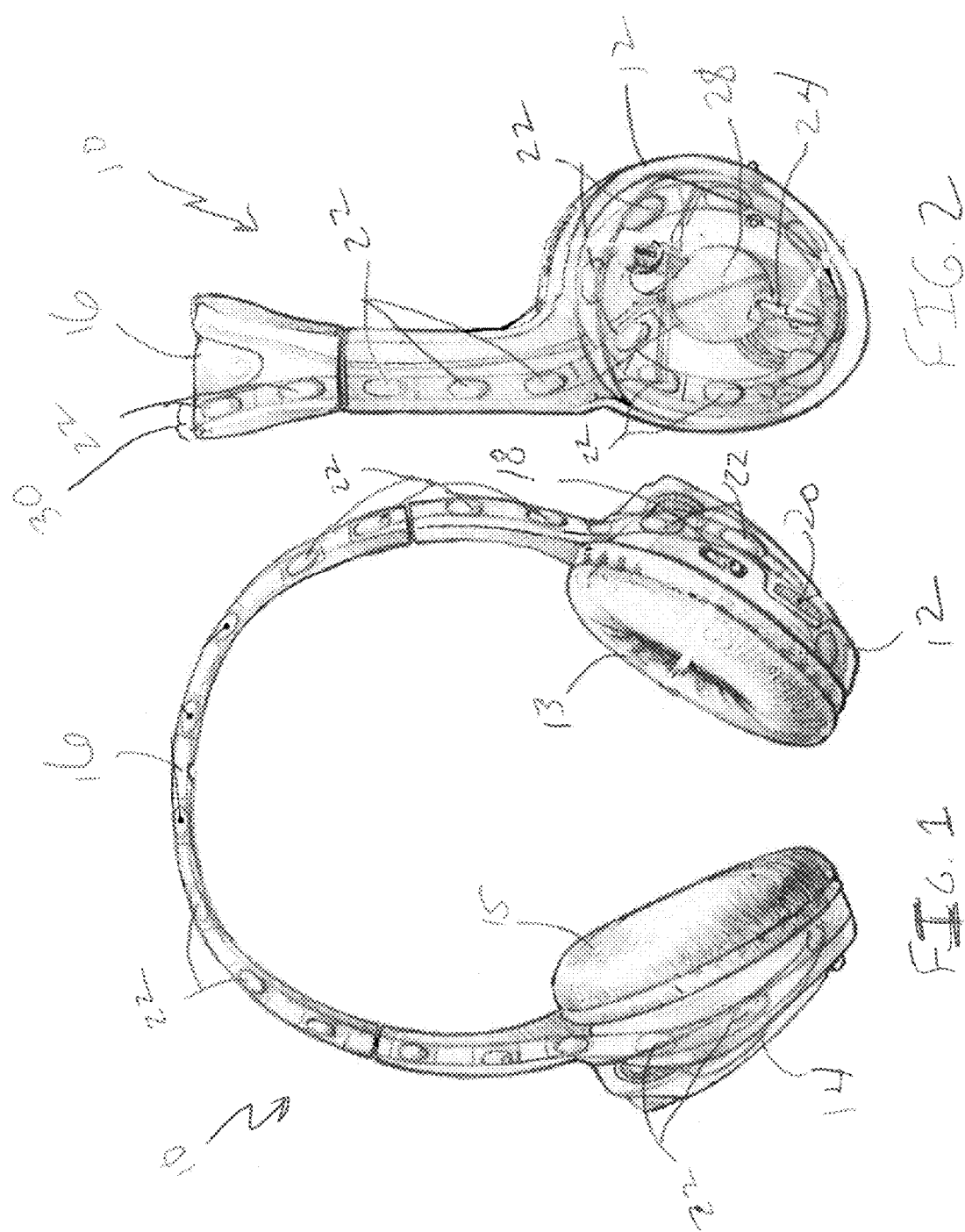
FIG. 1 provides a side view of one potential embodiment of an inventive headphone device including interactive lighting components therein.
FIG. 2 provides a profile view of the same headphone device of FIG. 1.

Aspects of the present invention relate to a multi-listener broadcast system including multiple luminescent headphones that are interactive with a remote audio broadcast device thus allowing for light displays to illuminate and/or react to the audio signal received thereby. The term "headphone-enabled" is intended to relate to an event at which listening to broadcast music is permitted primarily through the provision of multiple headphones to listeners (and thus is relatively quiet in terms of the broadcast music provided in such a manner to those not utilizing headphones at such an event). The term "light-generating components" pertains to any effective means of providing a light beam.

The present invention may be embodied in several hardware configurations, according to how and where the light-generating components are housed within or attached to the body of the inventive headphones. Without any intention of limiting the overall invention as it pertains to such arrangements, at least, FIGS. 2 and 3 are provided as descriptions of non-limiting possibilities to that extent. Again, the more important measure is the amount of candlepower measured as generated by the lights on or within the inventive headphones with any number of light-generating components present.

FIG. 1 shows a view of such an embodiment of an inventive headphone device 10 including a power-control ear piece 12 and an opposing ear piece 14 bridged by a headband portion 16. The power-control ear piece 12 includes a channel switch 18 (for at least two channels, although any number that can be permitted through wireless transmission and receipt could be utilized, such as from 3 to 10 channels, if not more), a volume control 20, as well as a number of other components (not illustrated) including a receiver, a power source (batteries), and controls for light-generating components (as well as controls for audio sensitive components in relation thereto). Both ear pieces 12, 14 include a transducer (not illustrated) to produce the necessary sounds from a transmitted signal, as well as padded covers 13, 15 for comfort to the user (as described above). Both pieces 12, 14 and the headband 16 also include, in this embodiment, again, embedded light-generating components 22 that are correlated to the channel selected by the user. Thus, as described above, such components 22 will change color in response to the broadcast channel, thus providing an outward indication as to which channel the listener is partaking at that moment in time. Such an indicator can thus provide both information to other listeners that may then choose to change their broadcast channel selection to that of a specific user (such as through the reactive movements and actions of a listener and the wish to understand the reasons for such actions and movements) as well as, in combination with the colors and movements generated by the other participants (listeners) within a headphone-enabled event a visual spectacle for an observer to enjoy. As noted above, LED light-generating components provide effective means to provide proper candlepower levels of light intensity in response to channel selections in this manner, as well as can facilitate color change in response to user modification of their broadcast channel. Thereby, the overall effect is provided of color changing capability in this manner. For instance, if the user selects channel 1, the color emitted from the light-generating components 22 might be yellow; for channel 2, pegged to the transmission of a second music source (160 or 170 in FIG. 3, for example), the emitted color might be blue; for a third channel, the color might be red; for a fourth channel, the color might be white; basically, the key is that the channel selection leads to a different emitted color (and preferably an easily distinguished color from any other associated channel). The light-generating components 22 may also be provided as audio sensitive devices that will react in relation to rhythmic impulses provided by the music broadcast over the listener's selected broadcast channel to further increase the overall effect for both listeners and spectators alike.

FIG. 2 provides a profile view of the same inventive headphone device showing the presence of an on/off switch 24 within the power-controlling ear piece 12. Such a view also provides another perspective of the placement of light-generating components 22 within the ear piece casing 26 (basically encircling the transducer 28, which here, can be viewed through a translucent material; such a material, utilized in this embodiment for the entire outer casing of the ear pieces 12, 14 and headband portion 16 is also frosted to an extent to provide an aesthetically pleasing look thereto both when not lit up and when such components 22 are in effect. Also, in this configuration, the components 22 do not follow through the entire body of the headband portion 16, but merely one side thereof 30; the other side is, in this embodiment, lacking any added components, ostensibly to provide some added resiliency to the overall device. However, if desired, the manufacturer may include such components 22 throughout the entirety of the headband portion 16 if desired, as well as in greater number throughout the ear pieces 12, 14 (or fewer numbers, of course). Again, this overall design provides the basis for an overall unique crowd effect for a headphone-enabled event, particularly with the utilization of more than one broadcast transmission sources (160, 170 of FIG. 3, for instance)(i.e., disc jockeys, as examples) that compete with one another to gain the most adherents to one specific channel as measured by the amount of colored generated within the listener group during such an activity.

FIG. 3 thus provides one semblance of a transmission layout for such a headphone-enabled event utilizing, in this embodiment, the headphone devices described in FIGS. 1 and 2, above. This simplified block diagram shows a first transmission source 110 and a second transmission source 115 (at least one such source may be utilized; more than two may also be employed if desired) music broadcasts located within a certain proximity of all listeners utilizing such headphones 120. In order to assure that such broadcasts are controlled to a certain distance from such a source 110, the signal 130 is permitted to travel around a periphery 140 within which the effectiveness of the headphones 120 to receive 150 such a signal 130 is maximized. With receivers 150 within the headphones 120 then, the overall configuration permits the listening group to choose channels for broadcasting based on different music sources 160, 170, with the headphones 120 pegged to modify color in response to channel selection of either such music source 160 or 170 (as well as for such headphones 120 to provide impulses of light in response to music rhythms provided by such transmitted broadcast signals 130 in relation to specific music sources 160 or 170. As noted above, such a result provides, due to the uniqueness of such wireless, resilient headphones 120, an overall effect within a headphone-enabled event context that has never been provided to date.

Numerous and varied other arrangements can be readily devised by those skilled in the art without departing from the spirit and scope of the invention. Moreover, all statements herein reciting principles, aspects and embodiments of the present invention, as well as specific examples thereof, are intended to encompass both structural and functional equivalents thereof. Additionally, it is intended that such equivalents include both currently known equivalents as well as equivalents developed in the future, i.e. any elements developed that perform the same function, regardless of structure.

What is claimed is:

1. A headphone-enabled multi-listener music-based system, comprising: multiple headphones, and at least one transmitter source to broadcast at least two different channel signals to said multiple headphones; wherein only one channel signal may be received by any single headphone at a time, wherein said headphones include at least one ear piece that provides total coverage of a user's ear upon proper placement thereover as well as a headband component that provides stability to the headphones over a user's head, wherein said headphones are wirelessly configured to receive said channel signals within a certain proximate range of said at least one transmitter source, wherein said headphones are outfitted to allow a user to select receipt of a specific transmitted broadcast channel signal on demand, wherein at least a plurality of said multiple headphones utilized within such system include embedded or surface-located light-generating components that generate a total of at least 10 candlepower for the entire headphone in response to reception of a selected channel signal, and wherein said light-generating components provide different colors in relation to the selection of each different broadcast channel signal.

2. The system defined in claim 1, further comprising: light-generating components within said headphones are present within both said at least one ear piece and within said headband component thereof.

3. The system as defined in claim 1, further comprising: audio sensitive light-generating components that react to the rhythmic impulses of music received by said headphones from said transmitter source.

4. The system as defined in claim 2, further comprising: audio sensitive light-generating components that react to the rhythmic impulses of music received by said headphones from said transmitter source.

5. A headphone device comprising: two ear pieces, a headband, and a receiver therein that wirelessly receives multiple broadcast signals from a closely located transmitter; wherein said device may only receive a single broadcast signal at a time, wherein said device includes means to select reception of any of said multiple broadcast signals on demand, wherein said headphone includes ear pieces of sufficient size to cover a user's ears when placed thereover, wherein said headphones include embedded and/or surface-located light-generating components within both of said ear pieces as well as at least a portion of said headband such that receipt of a signal from a closely located transmitter would allow for a specific color generated by said light-generating components in relation to the selected broadcast signal, and wherein the light generated by said light-generating components measures at least 10 candlepower in light intensity generation in response to reception of said selected broadcast signal.

6. The headphone device as defined in claim 5, further comprising: audio sensitive light-generating components that react to the rhythmic impulses of music received by said headphones.

7. The system as defined in claim 1 wherein at least four different broadcast channels are available to said multiple headphones and wherein said light-generating components within each of said headphones provides a different color in relation to each of said four different broadcast channels.

8. The system as defined in claim 2 wherein at least four different broadcast channels are available to said multiple headphones and wherein said light-generating components within each of said headphones provides a different color in relation to each of said four different broadcast channels.

9. The system as defined in claim 3 wherein at least four different broadcast channels are available to said multiple headphones and wherein said light-generating components within each of said headphones provides a different color in relation to each of said four different broadcast channels.

10. The system as defined in claim 4 wherein at least four different broadcast channels are available to said multiple headphones and wherein said light-generating components within each of said headphones provides a different color in relation to each of said four different broadcast channels.

11. The device of claim 5 wherein at least four different signals may be received and said light-generating components therein provide a different color in relation to each of said four different signals.

12. The device of claim 6 wherein at least four different signals may be received and said light-generating components therein provide a different color in relation to each of said four different signals.

* * * * *